United States Patent [19]
Horn

[11] Patent Number: 5,412,439
[45] Date of Patent: May 2, 1995

[54] LASER VISOR HAVING OVERLYING PHOTOSENSORS

[75] Inventor: Michael Horn, So. Setauket, N.Y.

[73] Assignee: Northrop Grumman Corporation, Los Angeles, Calif.

[21] Appl. No.: 18,539

[22] Filed: Feb. 17, 1993

[51] Int. Cl.⁶ .............................................. G02C 7/10
[52] U.S. Cl. ........................................ 351/45; 351/44; 351/158
[58] Field of Search ............... 351/44, 45, 158, 47, 351/41; 359/93, 94

[56] References Cited

U.S. PATENT DOCUMENTS 4,848,890  7/1989  Horn ................................. 351/44
5,060,062 11/1991  Dotson ............................. 351/158

OTHER PUBLICATIONS

L. N. Itseleva, "Light Goggles Employing Liquid Crystals," Sov. J. Opt. Technol. 57 (1) Jan. 1990 pp. 32–34.

R. Weiss, "From Armaments to Eyes at Army Materials Lab," Lasers & Optronics, Nov. 1990, p. 25.

Primary Examiner—William L. Sikes
Assistant Examiner—Hung Xuan Dang
Attorney, Agent, or Firm—Terry J. Anderson; Karl J. Hoch, Jr.

[57] ABSTRACT

A person's sight may be seriously damaged when high levels of coherent light impinge upon one's eyes. In order to protect against this, a visor or windshield is equipped with a first layer of photosensor segments respectively and optically aligned with corresponding light-blocking segments which take the form of LCD material or photorefractive glass. Wherever light impinges upon photosensor elements, at levels above a preselected threshold, the corresponding light-blocking segments are switched to a light-blocking mode. The end result is the blocking of harmful light in only those portions of an entire field of view where harmful levels of light radiation exist.

7 Claims, 2 Drawing Sheets

LASER VISOR HAVING OVERLYING PHOTOSENSORS

FIELD OF THE INVENTION

The present invention relates to protective eye gear, and more particularly to such gear specially designed to protect a user's eyes from damaging coherent light, such as laser light.

BACKGROUND OF THE INVENTION

Pilots and astronauts have long been plagued with maintaining operation of their craft while being "blinded" by the sun. It is common practice to provide protective eye gear, in the form of visors, goggles, or sunglasses, which sufficiently filters the sun's light to enable an individual to operate in strong sunlight. Although such devices may satisfactorily filter the sun's rays, they also darken the remaining clear field of view. This presents a dangerous situation for pilots in a combat situation, where the entire field of view must be visually monitored on a constant basis without attenuating light from objects such as approaching hostile aircraft.

In my earlier U.S. Pat. No. 4,848,890, protective eye wear for pilots was disclosed which had the capability of blocking or eclipsing strong light from only that point in the field of vision where sun shines. With the protective gear of my previous patent, a pilot would have a relatively clear field of view where he could sight objects in the sky without being impeded by light filters that otherwise prevent detection of targets and other objects necessary for clear sighting.

My previous invention utilizes a visor with a liquid crystal (LC) matrix over the surface thereof, individual elements of the matrix being selectively energizable to present light blocking points in a wearer's field of vision corresponding to the instantaneous position of the sun in a field of view. As the field of view changes, and more particularly the position of the sun within the field of view, the light blocking LC elements will change within the matrix to correspond with the shifted sun position. A two-dimensional photosensor mounted on the visor detects changing sun position within the field of view so that corresponding LC elements may be activated to a light blocking condition.

The improvement offered by my previous invention not only greatly aids pilots and astronauts but is also applicable to industrial and sports applications where similar problems with light "blindness" may temporarily or permanently impede an individual's sight.

Although my previous invention is quite useful in protecting a wearer from damaging sunlight, it is only useful where a sensing device detects the angle of sunlight falling upon the entire surface of a visor. This would be a problem if a narrow beam of coherent light (e.g. a laser) impinged upon the visor but did not impinge upon the sensor. This is a realistic problem in the battlefield of the future which will undoubtedly be heavily trafficked by laser beams, some as part of range-finding equipment, some to track weapons that are delivering high-speed kinetic-energy projectiles, and some blasting enemy tanks and fortifications with high-energy density laser weapons. The convergence of visible light on the retina increases the energy density by factors of $10^4$. Thus, a direct hit of an otherwise harmless laser beam can do permanent damage to a soldier's vision.

At the present time coatings have been developed on glass to reject specific wavelengths that are currently employed in laser operations — although the appearance of continuously tunable systems makes such filters obsolete. The present technology of coating three-inch-thick glass with a light-sensitive gelatin into which is embedded a diffraction hologram tuned to scatter specific wavelengths has provided the Army with a tank window that will reject laser radiation and defeat kinetic-energy threats of the 30-caliber armor-piercing type. The glass may shatter when struck with a bullet but a polycarbonate backing absorbs the fragments.

Of considerable interest is the planned Army program to develop materials that will reject coherent laser radiation and permit transmittance of nonlethal incoherent radiation. There are a number of concepts on the drawing board.

BRIEF DESCRIPTION OF THE PRESENT INVENTION

The present invention offers a solution, which is an improvement of the protective gear disclosed in my prior patent. In the case of a visor, a matrix of photosensors forms a first layer of a laminated structure. In optical alignment with these segments are corresponding segments of an LCD or photorefractive glass electrically controlled in segments to either transmit or block light therethrough, depending upon the level of incident light on the optically aligned sensors. The present invention can be extended to a cockpit or other vehicle windshield which may be subjected to high-intensity light during a military confrontation.

Utilization of a liquid crystal reservoir becomes relevant for continuous wave laser light (e.g. $CO_2$ laser). In the event a pulse laser light is anticipated, photorefractive glass would be employed instead of the liquid crystal structure. As is known by those of skill in the art, this type of glass achieves selective refraction as is achieved by liquid crystal material.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
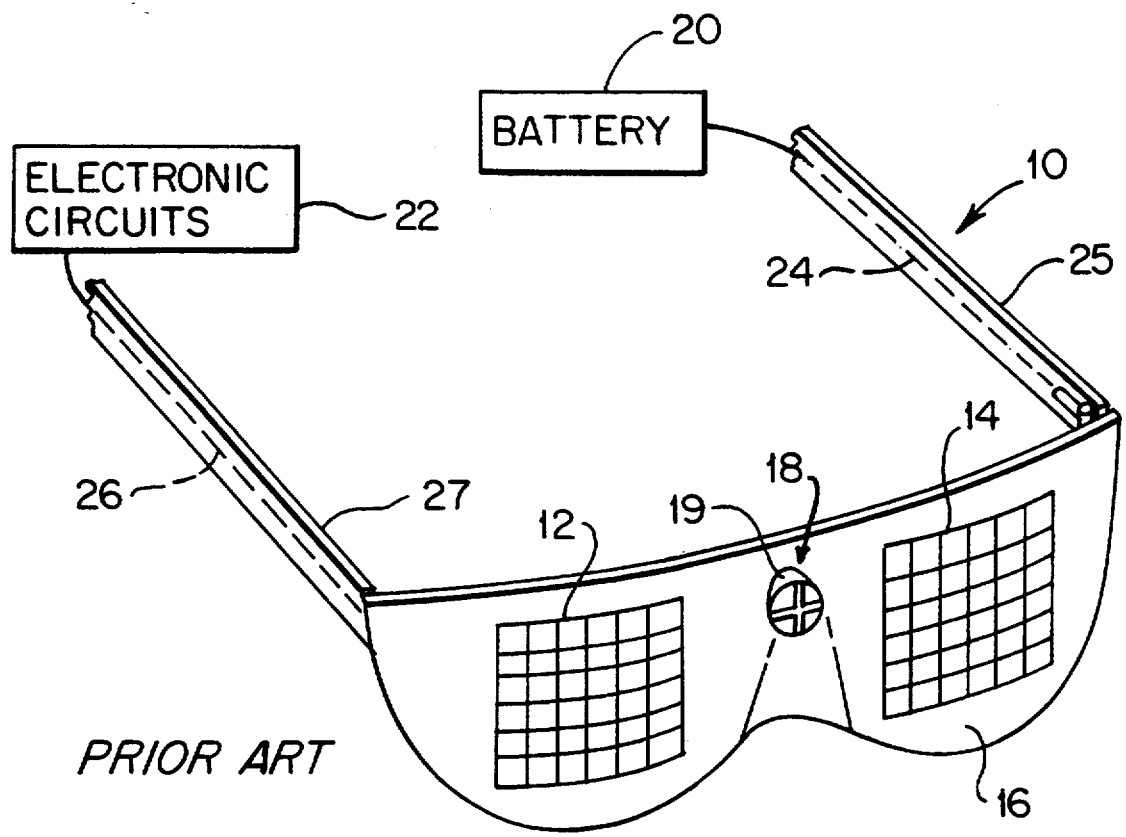
FIG. 1 is a perspective view of my sun-blocking visor as disclosed in my prior patent.

FIG. 1 illustrates the prior art sun-blocking visor disclosed in my U.S. Pat. No. 4,848,890. The present invention to be discussed hereinafter is an improvement of the concept disclosed in that patent.

In FIG. 1 liquid crystal matrices are positioned over the wearer's eyes and a sun-tracking photosensor and related electronics determines the area of direct sunlight within the viewer's field of view. Segments of the matrix corresponding to the sunlit area are switched to a light-blocking state so that the remaining unaffected field of the view may be maintained.

More particularly, referring to FIG. 1, reference numeral 10 generally indicates, in diagrammatic form, a visor or other protective eye wear (goggles, sunglasses, etc.) which is worn by an individual. Two liquid crystal (LC) matrices 12 and 14 are aligned with the wearer's eyes and individual elements of the matrices may be energized, as will be presently explained, to block incident irritating light, such as strong sunlight, in only those areas of a wearer's field of view where the sunlight is present. Other elements of the matrices will remain light transmissive to the wearer's field of view. The visor 16 is merely shown in an illustrative shape and may be suited for a particular application such as aeronautics, avionics, space, sports, recreation, industrial, etc. A sectional photosensor 18 is centered between the LC matrices and serves to track the shift of sunlight within the field of view of the wearer. In an elementary form of the photosensor, it may be a four quadrant photosensor including four individual photodiodes of conventional design and fabrication. A fish eye lens 19 is shown mounted over the photosensor and is intended to focus sunlight or other strong light on the photosensor in a manner corresponding to the appearance of sunlight within a wearer's field of vision. Thus, the combination of photosensor 18 and fish eye lens 19 serves as a sunlight tracking means. The LC matrices and necessary electronic circuits 22 are powered by a battery 20, which may include discrete, solar, integrated rechargeable, or other suitable power supplies. In the event the protective eye gear is to have temples 25, 27, respective wires 24 and 26 may be incorporated in the temples to connect the battery and electronic circuits together with the LC matrices. In a typical situation, conductors (not shown) are incorporated in the visor 16 to connect the matrices 12 and 14 with the wires 24 and 26. This technique is quite conventional in the printed circuit art.

Figure 2:
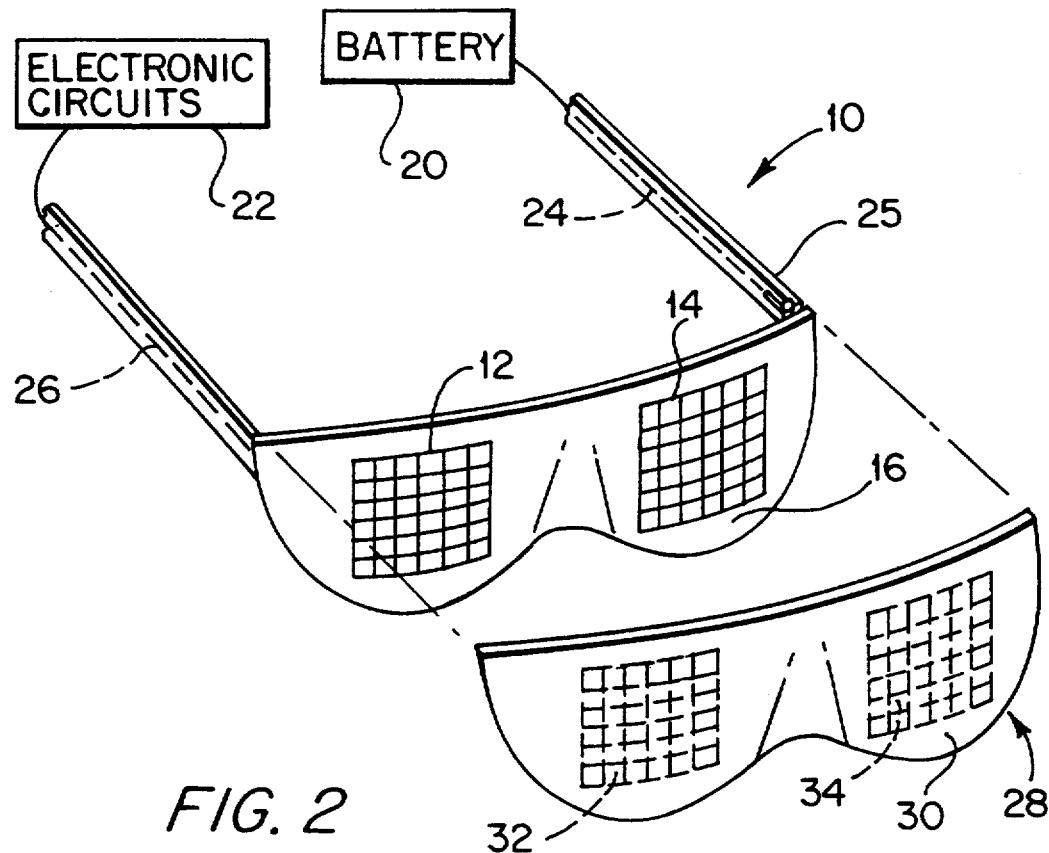
FIG. 2 is a perspective view similar to that of FIG. 1 indicating the additional improvement of the present invention.

FIG. 2 schematically illustrates the improvement of the present invention which includes a layer 28 of photosensors, in matrix form, corresponding to the LCD matrices of the visor. The photosensor layer 28 replaces the sun tracking photosensor 18 of the prior patent. The photosensor layer 28 essentially includes a transparent substrate 30 having spaced matrices 32 and 34 of photosensor segments in optical alignment with corresponding LCD segments of the LC matrices 12 and 14.

Figure 3:
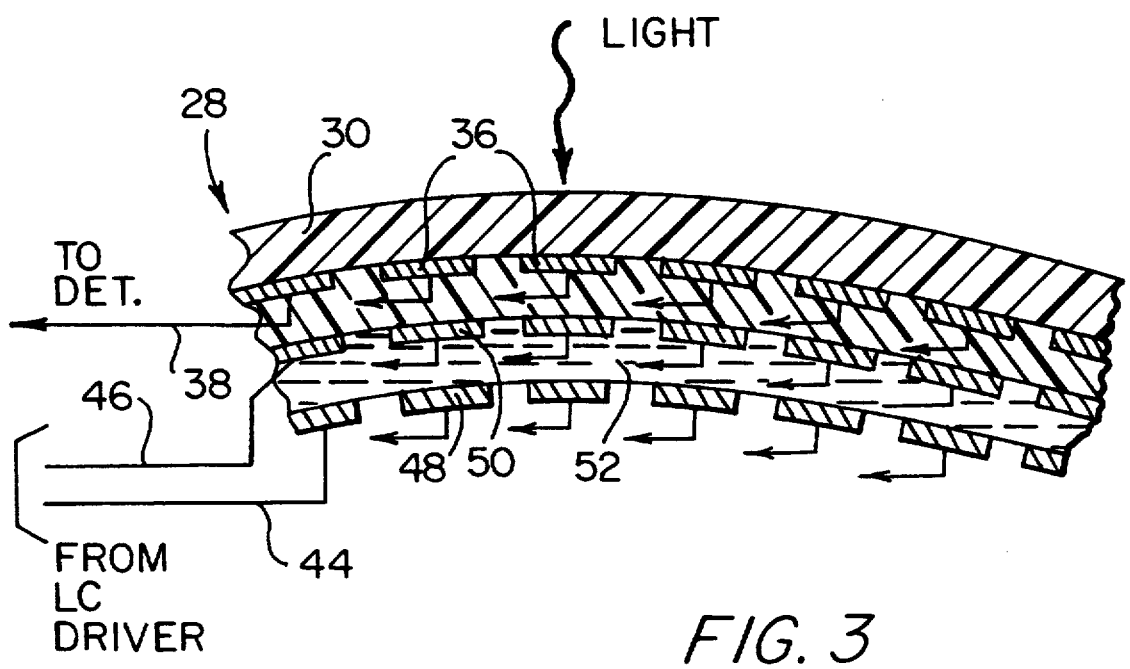
FIG. 3 is a partial cross-sectional view of the present invention.
Figure 4:
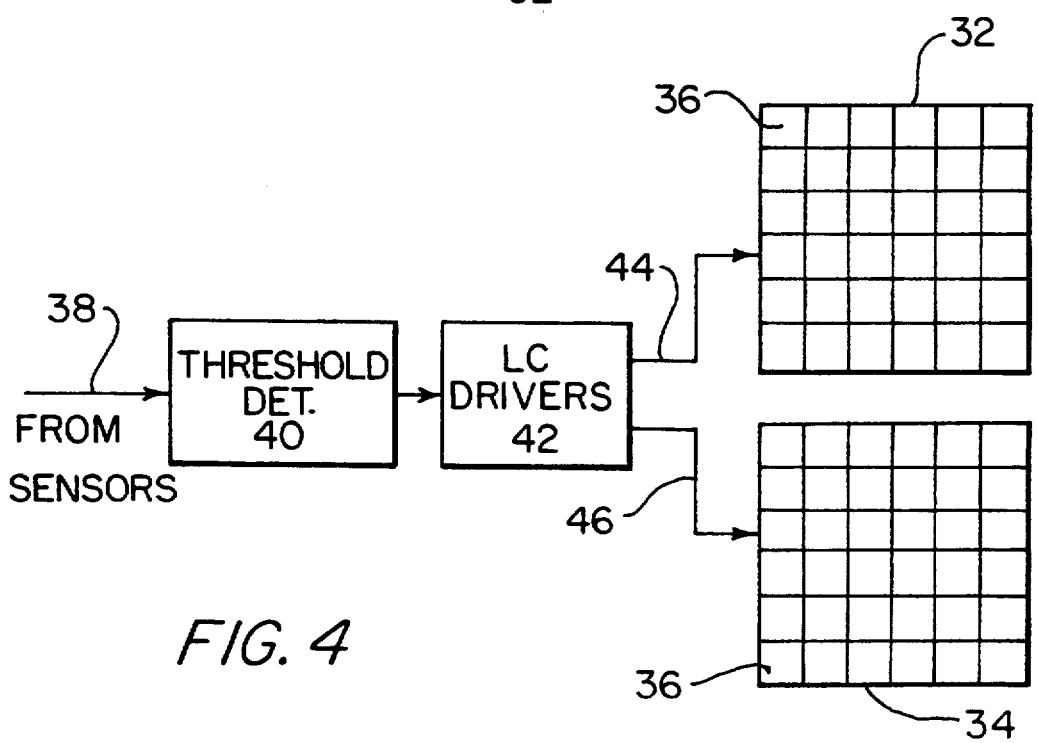
FIG. 4 is a simplified block diagram of the electronics employed in the present invention.

FIG. 3 shows the construction of the protective eye gear in greater detail. The substrate 30, preferably made of clear plastic, has an outer surface which first encounters incident light. Individual photosensor segments 36 are appropriately mounted to the opposite surface of the substrate 30. The photosensors are preferably made of GaAs material. Each of the photosensors has an output lead 38 connected thereto which is connected to a threshold detector 40 shown in FIG. 4. In fact, individual threshold detectors are provided for each of the sensors so that when the output from a particular sensor exceeds a preselected threshold, this event is assumed to evidence the incidence of a damagingly high level of light on the sensor and causes an appropriate output at that detector. As shown in FIG. 4, the threshold detectors 40 are connected to corresponding conventional LC drivers 42.

An assembly of wires such as 44 and 46 connect each LC driver with a corresponding LC element, as indicated in FIG. 3. An output from an LC driver imposes a voltage across LC electrodes 48 and 50 so as to switch the state of the liquid crystal material contained in LC reservoir 52 to a light-blocking condition and those segments of the LC material which are in optical alignment with the affected photosensor segments. Accordingly, light blocking is extremely selective within a field of view and may be effected on a segment-by-segment basis.

It is to be emphasized that, although FIGS. 2 and 4 indicate the inclusion of two spaced light-blocking matrices, a single continuous matrix of light-blocking elements may be included along the entire face of the visor.

In fact, the present invention is not intended to be limited solely to eye protective visors or other types of eye wear but can also be extended to larger viewing areas such as cockpit windshields. In the case of a large surface such as a cockpit windshield, it would be necessary to coat the entire surface with a continuous matrix of light-blocking elements comprising photosensors and optically aligned light-blocking segments.

Further, the present invention is not limited to the use of LC material. Although this would be a preferred material for protecting against continuous wave laser light (e.g. $CO_2$ lasers), commercially available photorefractive glass would be preferable instead of the liquid crystal material in the event that pulse laser light was to be anticipated. This type of glass achieves selective refraction as does liquid crystal.

Further application of the present invention is for eye protection in any environment where a portion of a person's field of view will be subjected to potentially harmful levels of light radiation.

It should be understood that the invention is not limited to the exact details of construction shown and described herein for obvious modifications will occur to persons skilled in the art.

I claim:

1. A shield for protecting eyes from potentially harmful coherent light, comprising:
   a transparent substrate upon which incident coherent light falls;
   at least one matrix layer of transparent photosensor segments mounted to the substrate;
   at least one matrix layer of electrically controlled and normally transparent segments mounted behind the photosensor segments;
   the electrically controlled segments being in respective optical alignment with the photosensor segments and being selectively switched to block transmission of incident light, above a preselected threshold level, falling on corresponding photosensor segments.

2. The shield set forth in claim 1 wherein the photosensor segments are fabricated from GaAs material.

3. The shield set forth in claim 1 wherein the electrically controlled segments are fabricated from liquid crystal material.

4. The shield set forth in claim 1 wherein the electrically controlled segments are fabricated from refractive glass.

5. The shield set forth in claim 1 wherein the shield is shaped as protective eye wear;

6. The shield set forth in claim 1 wherein the shield is in the form of an aircraft cockpit windshield.

7. A method for selectively blocking light from a person's field of vision, comprising the steps:

sensing light at matrix points in front of a person's field of vision where incident light exceeds a predetermined level;

interposing light blocking matrix points, in optical alignment with the sensing matrix points, for those aligned matrix points where incident light exceeds the predetermined level; and retaining the remaining aligned matrix points transparent.

* * * * *